Patented Nov. 19, 1940

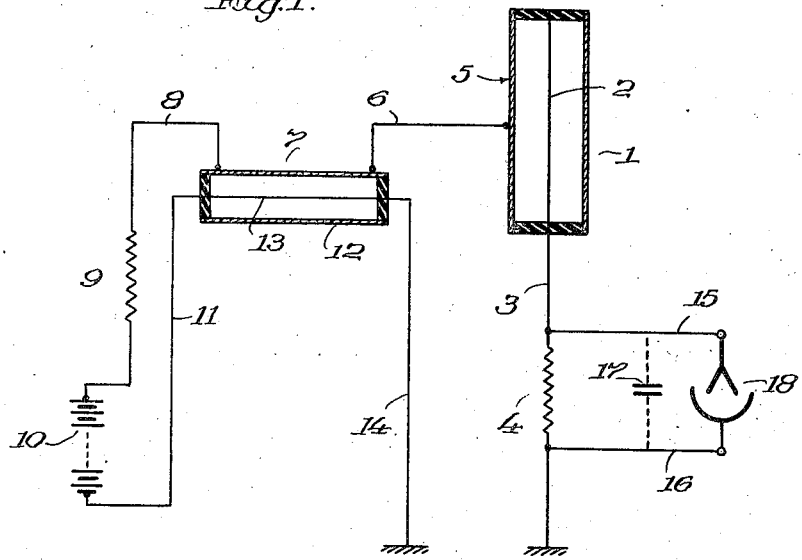
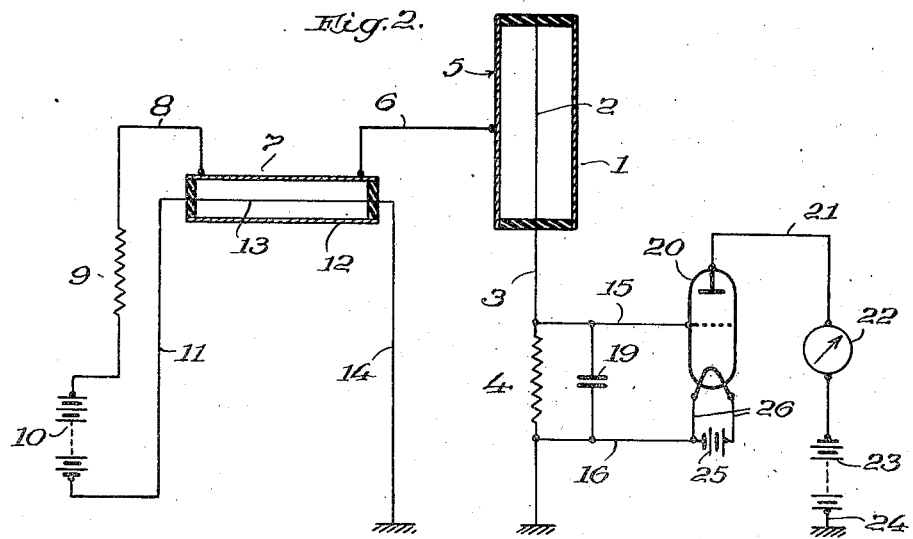

2,222,452

UNITED STATES PATENT OFFICE 2,222,452

APPARATUS FOR MEASURING SHORT-WAVE RAYS

Adolf Trost, Berlin-Steglitz, Germany, assignor to Gesellschaft zur Förderung Zerstörungsfreier Prüfverfahren e. V., Berlin-Dahlem, Germany, a company of Germany Application January 13, 1939, Serial No. 250,687
In Germany December 14, 1937

4 Claims. (Cl. 250—83)

This invention relates to an apparatus for measuring short-wave rays such as X-rays, gamma rays, ultraviolet rays and the like by means of a Geiger-Müller counter preferably of high resolving power for the purpose of testing materials without destroying the same.

It is well known that a Geiger-Müller counter is a discharging tube comprising a hollow metal cylinder hermetically closed at its ends by caps of insulating material and having in its interior an axially arranged metal wire. This wire, which extends through the whole cylinder, forms one electrode of the counter tube, the other electrode being the metal cylinder. If a high voltage (counter voltage) is laid on the counter tube between the metal cylinder and the wire stretched therein, each electron released in the interior of the counter tube by the impinging radiation patricle, causes a discharge impulse, that is a certain quantity of electricity is momentarily transported through the counter tube. The quantity of electricity passing through the counter tube per second is designated as counter current.

By the "resolving power" of a tube is understood the short interval of time which should occur between two ray particles passing into the counter tube, so that these can be indicated by an indicating device. Therefore a counter tube having high resolving power is a counter tube with which very large ray intensities (numbers of impulses) can be measured.

Taking into consideration particularly the special requirements of material testing, free from destructions, the problem which the invention sets out to solve is, to enable a "standing record" that is an instantaneous record of the measuring values during the tests. The radiation intensity impinging per second on the Geiger-Müller counter is to be measured by the instantaneous deflection of an indicating instrument. Only with such an instantaneous indication it is possible to economically test work pieces by X-rays or by gamma rays. The conditions are similar when testing interferences of X-rays or of ultraviolet rays. In the known methods of the Geiger-Müller counter recording this requirement could not be fulfilled. For example the individual Geiger-Müller counter impulses were added with the aid of a counting mechanism and with the aid of this integrating indication the mean value of the radiation intensity impinging per second during the period of observation was calculated after a predetermined time. This method on the one hand wastes too much time for technical purposes and on the other hand it fails, when more than 100 impulses occur in the Geiger-Müller counter per second, owing to the inertia of the mechanical counting mechanisms known at present, however, in many technical applications very high numbers of impulses, for example more than 100,000 per second have to be dealt with, when, for example, Geiger-Müller counters with very high resolving power are used for measuring. Several measuring arrangements are known for obtaining an instantaneous indication. In all these known arrangements the Geiger-Müller counter is directly connected to an amplifier and the amplified Geiger-Müller counter impulses are integrated to a mean counter current by means of a condenser or an indicating measuring instrument. These known measuring arrangements are, however, open to the following objections: When it is a question of the amplification of individual current impulses, especially when these follow in quick succession, the resolving power of the amplifier used is of importance. The resolving power of the amplifier, is, however, bad in the case of the current impulses which have to be amplified, following one another in quick succession. Such a bad splitting up capacity makes itself disagreeably apparent in that the amplifier no longer amplifies every one of the individual counter current impulses following in quick succession, but merely suppresses some of these individual impulses. The result is that no indication proportional to the real number of Geiger-Müller counter impulses and consequently to the radiation intensity impinging on the Geiger-Müller counter takes place on the indicating instrument, which is equivalent to wrong measuring results.

This objection is overcome according to the invention when the unamplified individual impulses of the Geiger-Müller counter are integrated to a mean counter current, by means of a condenser, said mean current being measured either directly or after amplification by means of a measuring instrument. If said instrument has sufficient inertia, this inertia can serve as capacity for integrating the unamplified individual impulses to a mean counter current in the case that said current is measured directly by means of said indicating measuring instrument. The mean counter current, the proportionality of which to the impinging radiation intensity is only limited by the resolving power of the Geiger-Müller counter itself, is measured preferably by the drop in potential produced on a resistance of suitable size either directly with a sensitive voltmeter or, in the case of a condenser arranged in parallel with the resistance indirectly by means of an ordinary ammeter after amplification by means of an electron valve. Whereas the number of impulses in a wide range is independent of the voltage of the Geiger-Müller counter, this is not the case with the Geiger-Müller counter current which results from number of impulses multiplied by impulse magnitude. The apparatus according to the invention therefore requires the Geiger-Müller counter voltage to be maintained absolutely constant, which is effected, in a further development of the invention, by connecting in parallel an additional "glow" Geiger-Müller tube (tube with increased operating voltage), the glow voltage of which must be equal to the voltage of the Geiger-Müller counter used for measuring.

Such a "glow" Geiger-Müller tube is a tube which is not used for measuring or counting the number of radiation impulses but for stabilizing the operative voltage making use of the well-known fact that a counter tube always glows at an accurately predetermined voltage, that is causes a discharge. This voltage is utilized for operating the metering or counting Geiger-Müller tube. It is evident that the voltage on the glow tube is higher than the glow voltage supplied as operating voltage to the counter tube. In the case of any fluctuations in the voltage on the glow tube the operating voltage on the counter tube remains constant. If the voltage on the glow tube increases only the current of the counter tube and consequently the portion of the voltage taken up by a resistance series-connected with the glow tube will become greater.

Two embodiments of the invention are illustrated diagrammatically in Figs. 1 and 2 of the accompanying drawing:

The Geiger-Müller counter tube subjected to the rays to be measured is designated by 1. The end of a counter wire 2 of this tube is connected by a resistance 4. A stabilizer counter tube 7 is connected in parallel to the counter tube, the metallic cylinder walls 5 and 12 of the two tubes 1 and 7 are conductively connected by a line 6 and the counter wire 13 of the stabilizer tube 7 is also earthed by a line 14. A relatively high voltage 10 is supplied to the two electrodes 12 (cylinder wall) and 13 (counter wire) of the stabilizer 7 by means of lines 8 and 11 connected to a series resistance 9. The glow voltage of the stabilizer counter tube 7 is equal to the necessary service voltage of the counter tube 1. The service voltage of the counter tube 1 is kept very constant by means of the stabilizer tube as already described. A very sensitive but relatively sluggish voltmeter is connected in parallel to the resistance 4 by the lines 15 and 16. This sluggish voltmeter operates in such a manner that individual counter tube impulses are no longer indicated by indicator deflections, but the counter tube current composed of many individual impulses is measured by a constant indicator deflection. The inertia of the voltmeter is assisted, if required, by parallel connecting to the instrument a condenser 17 of suitable size. Thus, in this form of construction, the voltmeter itself, owing to sluggishness, accumulates the individual counter tube impulses to a mean counter tube current, being assisted, if necessary, by a condenser, as above stated.

In the example illustrated in Fig. 2 the individual counter tube current impulses are accumulated or added to form a mean counter tube current by means of a condenser 19 of suitable sizes connected in parallel to the resistance 4, this current being amplified by means of an electron tube 20 and then indicated by an ordinary ammeter 22. For this purpose the condenser is connected to the grid by a line 15 and to the cathode of the electron tube by a line 16. The heating voltage source for the heated filament 26 of the electron tube is designated by 25 whereas 23 designates the source of anode voltage which is supplied to the anode circuit of the electron tube formed by the line 21 and the earthed line 24. In this instance it is obvious that a constant indication of the counter tube current is also obtained on the measuring instrument 22.

I claim:

1. A device for measuring short wave rays such as X-rays, gamma rays, ultra-violet rays and the like, especially for the purpose of testing materials without destroying the same, comprising a Geiger-Müller counter possessing a preferably high resolving power, a source of voltage connected to the two electrodes of said counter, a resistance connected at one end to the inner electrode of said counter and at its other end to one pole of said source of voltage, a condenser connected at one end to the inner electrode of said counter and at its other end to said pole of said source of voltage and adapted to integrate the individual impulses of said counter to a mean counter current, an amplifier including an amplifier tube, said condenser connected to said amplifier tube to amplify said mean counter current, and a measuring instrument in said amplifier adapted to indicate the amplified mean counter current.

2. A device for measuring short wave rays such as X-rays, gamma rays, ultra-violet rays and the like, especially for the purpose of testing materials without destroying the same, comprising a Geiger-Müller counter possessing a preferably high resolving power, a source of voltage connected to the two electrodes of said counter, a measuring instrument connected at one side to the inner electrode of said counter and at its other side to one pole of said source of voltage, and a condenser connected in parallel to said measuring instrument and adapted to integrate the individual impulses of the counter to a mean counter current, said measuring instrument adapted to indicate this mean counter current.

3. A device for measuring short wave rays such as X-rays, gamma rays, ultra-violet rays and the like, especially for the purpose of testing materials without destroying the same, comprising a Geiger-Müller counter possessing a preferably high resolving power, a source of voltage connected to the two electrodes of said counter, a resistance connected at one end to the inner electrode of said counter and at its other end to one pole of said source of voltage, a condenser connected at one end to the inner electrode of said counter and at its other end to said pole of said source of voltage and adapted to integrate the individual impulses of said counter to a mean counter current, and a voltage meter connected to both sides of said condenser and adapted to indicate said mean counter current by drop in potential on said resistance.

4. A device for measuring short wave rays such as X-rays, gamma rays, ultra-violet rays and the like, especially for the purpose of testing materials without destroying the same, comprising a first Geiger-Müller counter adapted to measure the radiation, a second glowing Geiger-Müller counter adapted to stabilize the service voltage of said first Geiger-Müller counter, the two outer and inner electrodes of the two counters conductively connected with one another, a source of voltage connected to the two electrodes of the second counter, and a resistance connected up between said source of current and the outer electrode of said second counter, the glowing voltage of said second counter being equal to the service voltage of said first counter.

ADOLF TROST.